United States Patent
Bibler et al.

(10) Patent No.: US 6,871,501 B2
(45) Date of Patent: Mar. 29, 2005

(54) METHOD AND APPARATUS TO DECREASE GAS TURBINE ENGINE COMBUSTOR EMISSIONS

(75) Inventors: John D. Bibler, Tucson, AZ (US); Timothy J. Held, Blanchester, OH (US); Mark A. Mueller, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/308,711

(22) Filed: Dec. 3, 2002

(65) Prior Publication Data

US 2004/0103668 A1 Jun. 3, 2004

(51) Int. Cl.[7] ............................... F02C 7/22; F23R 3/10
(52) U.S. Cl. .......................... 60/772; 60/737; 60/747; 60/748; 60/752; 60/755
(58) Field of Search .......................... 60/772, 737, 746, 60/747, 748, 752, 755, 756, 757

(56) References Cited

U.S. PATENT DOCUMENTS

| | | | |
|---|---|---|---|
| 4,567,857 A | 2/1986 | Houseman et al. | |
| 4,754,600 A | * 7/1988 | Barbier et al. | 60/737 |
| 5,323,604 A | 6/1994 | Ekstedt et al. | |
| 5,540,056 A | * 7/1996 | Heberling et al. | 60/737 |
| 5,584,178 A | 12/1996 | Naegeli et al. | |
| 5,590,529 A | 1/1997 | Joshi et al. | |
| 5,613,363 A | 3/1997 | Joshi et al. | |
| 5,623,827 A | * 4/1997 | Monty | 60/748 |
| 5,664,412 A | * 9/1997 | Overton | 60/748 |
| 5,894,732 A | * 4/1999 | Kwan | 60/748 |
| 5,970,715 A | 10/1999 | Narang | |
| 6,070,410 A | 6/2000 | Dean | |
| 6,141,967 A | 11/2000 | Angel et al. | |
| 6,164,055 A | * 12/2000 | Lovett et al. | 60/737 |
| 6,192,688 B1 | 2/2001 | Beebe | |
| 6,195,607 B1 | 2/2001 | Rajamani et al. | |
| 6,298,667 B1 | * 10/2001 | Glynn et al. | 60/737 |
| 6,331,109 B1 | * 12/2001 | Paikert et al. | 60/752 |
| 6,389,815 B1 | * 5/2002 | Hura et al. | 60/746 |
| 6,418,726 B1 | 7/2002 | Foust et al. | |
| 6,474,071 B1 | * 11/2002 | Durbin et al. | 60/748 |
| 6,530,223 B1 | * 3/2003 | Dodds et al. | 60/746 |

* cited by examiner

Primary Examiner—Ted Kim
(74) Attorney, Agent, or Firm—William Scott Andes; Armstrong Teasdale LLP

(57) ABSTRACT

A method enables a gas turbine engine including a combustor to be operated. The combustor includes a mixer assembly including an air swirler, a premixer, a dome plate, and a heat shield. The method comprises discharging fluids from the air swirler into the premixer, and directing cooling fluids through a cooling opening defined in at least one of the swirler and the dome plate towards an upstream side of the heat shield for impingement cooling of the heat shield.

18 Claims, 3 Drawing Sheets

METHOD AND APPARATUS TO DECREASE GAS TURBINE ENGINE COMBUSTOR EMISSIONS

BACKGROUND OF THE INVENTION

This application relates generally to combustors and, more particularly, to gas turbine combustors.

Air pollution concerns worldwide have led to stricter emissions standards both domestically and internationally. Pollutant emissions from industrial aero engines are subject to Environmental Protection Agency (EPA) standards that regulate the emission of oxides of nitrogen (NOx), unburned hydrocarbons (HC), and carbon monoxide (CO). In general, engine emissions fall into two classes: those formed because of high flame temperatures (NOx), and those formed because of low flame temperatures that do not allow the fuel-air reaction to proceed to completion (HC & CO).

At least some known gas turbine combustors include between 10 and 30 mixers, which mix high velocity air with liquid fuels, such as diesel fuel, or gaseous fuels, such as natural gas. These mixers usually consist of a single fuel injector located at a center of a swirler for swirling the incoming air to enhance flame stabilization and mixing. Both the fuel injector and mixer are located on a combustor dome.

The combustor includes a mixer assembly and a heat shield that facilitates protecting the dome assembly. The heat shields are cooled by impinging air on the side nearest the dome to ensure that the operating temperature of the heat shields remains within predetermined limits. The spent impingement cooling air is introduced to the combustion chamber downstream from the mixer assembly. However, because the spent impingement cooling air is channeled downstream from the mixer assembly, the spent cooling air does not effectively mix with fuel prior to entering a flame front, and as such, may adversely impact NOx emissions.

BRIEF SUMMARY OF THE INVENTION

In one aspect, a method for operating a gas turbine engine including a combustor is provided. The combustor includes at least one premixer assembly, a dome plate, and heat shield assemblies. The method comprises discharging fluids from a high pressure source through air swirlers within the premixers. Cooling air is discharged through at least one of the domeplate and the premixer assembly to provide impingement cooling of the heat shield assemblies.

In a further aspect of the invention, a mixer assembly for a gas turbine engine combustor is provided. The mixer assembly includes a premixer comprised of air swirlers for channeling air flow into the mixing chamber. The mixer assembly is positioned in the combustor with a heat shield assembly that extends downstream from the premixer and the dome plate. The heat shield includes a downstream side and an upstream side. The dome plate includes openings configured to discharge cooling air for impingement cooling of at least a portion of the heat shield.

In another aspect, a gas turbine engine combustor including a mixer assembly and a combustion chamber is provided. The mixer assembly includes a premixer comprised of air swirlers for channeling air flow into the mixing chamber. The mixer assembly is positioned in the combustor with a heat shield assembly that extends downstream from the premixer and the dome plate. The heat shield includes a downstream side and an upstream side. The dome plate includes openings configured to discharge cooling air for impingement cooling of at least a portion of the heat shield.

DETAILED DESCRIPTION OF THE INVENTION

Figure 1:
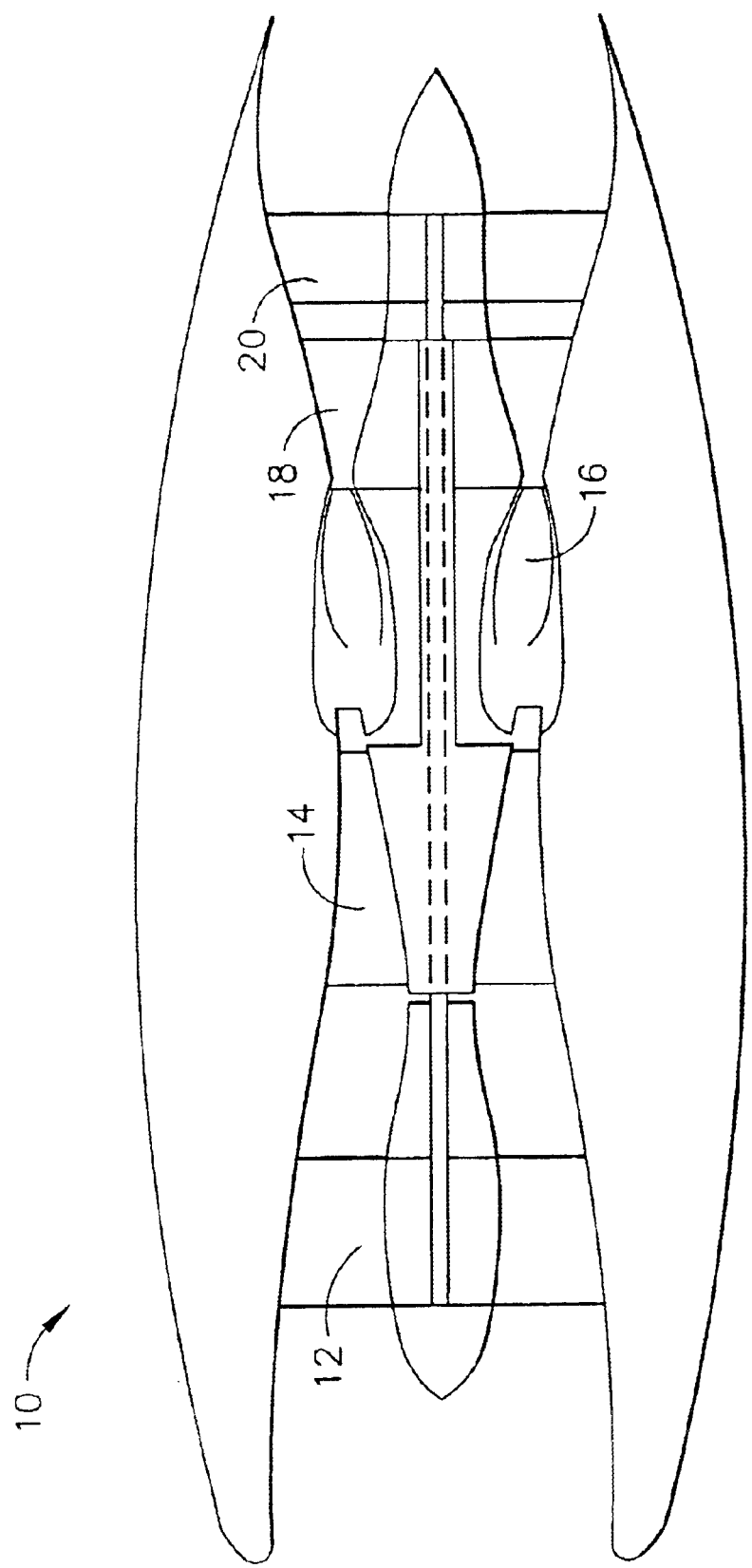
FIG. 1 is schematic illustration of a gas turbine engine including a combustor.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20. In one embodiment, gas turbine engine 10 is a CFM engine available from CFM International. In another embodiment, gas turbine engine 10 is an LM6000 DLE engine available from General Electric Company, Cincinnati, Ohio.

Figure 2:
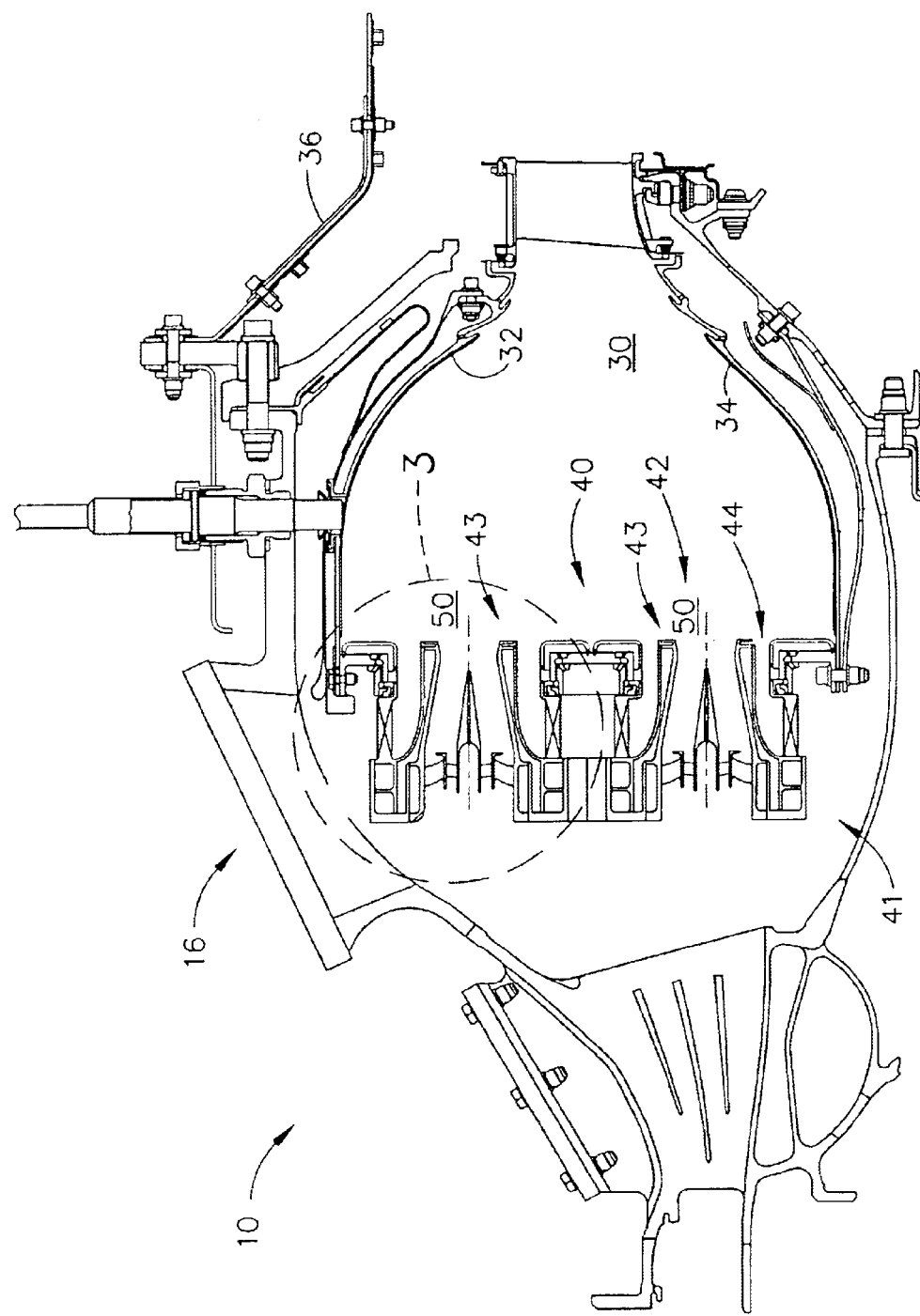
FIG. 2 is a cross-sectional view of an exemplary combustor that may be used with the gas turbine engine shown in FIG. 1.
Figure 3:
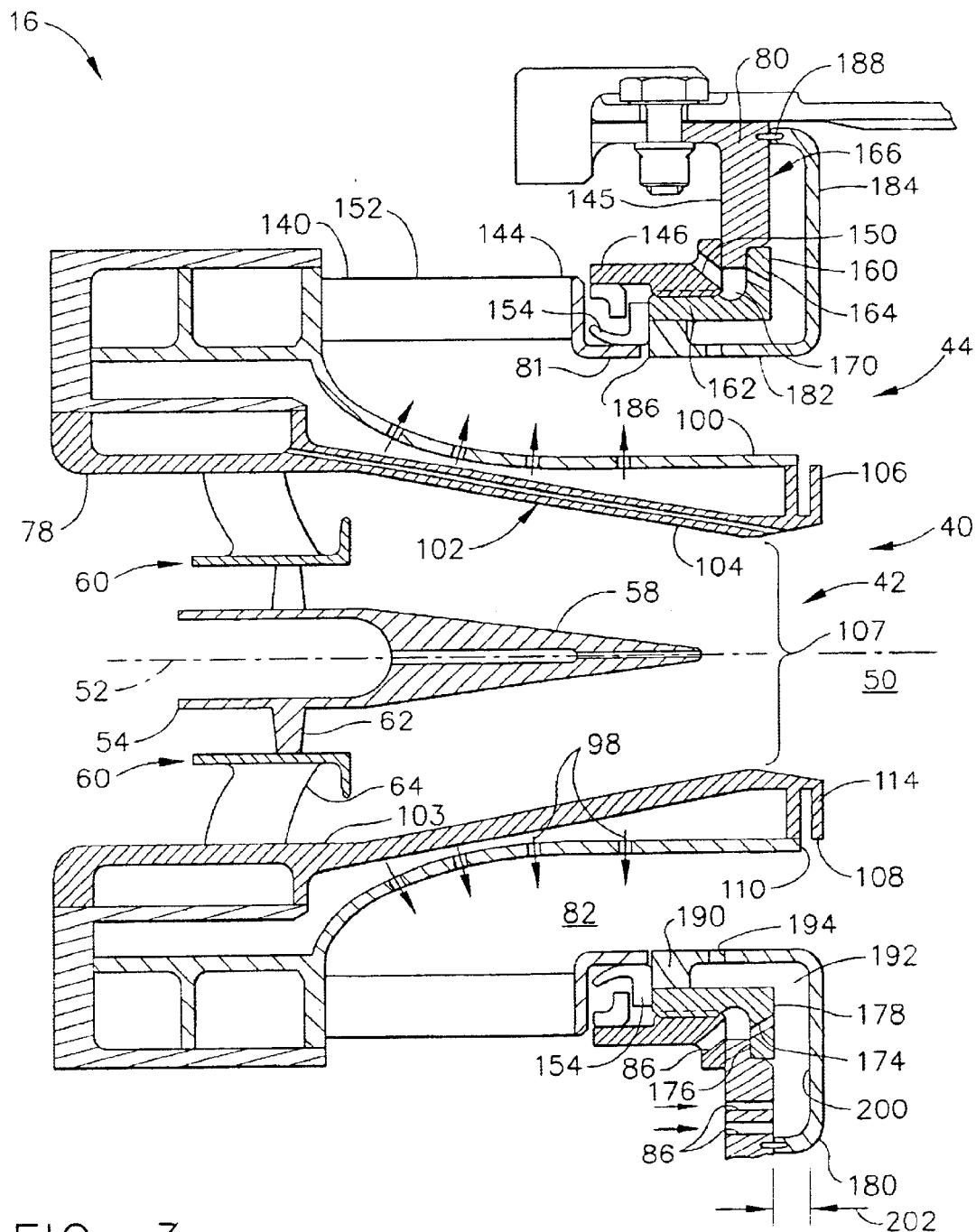
FIG. 3 is an enlarged view of a portion of the combustor shown in FIG. 2 taken along area 3.

FIG. 2 is a cross-sectional view of combustor 16 for use with a gas turbine engine, similar to engine 10 shown in FIG. 1, and FIG. 3 is an enlarged partial view of combustor 16 taken along area 3. Combustor 16 includes a combustion zone or chamber 30 defined by annular, radially outer and radially inner liners 32 and 34. More specifically, outer liner 32 defines an outer boundary of combustion chamber 30, and inner liner 34 defines an inner boundary of combustion chamber 30. Liners 32 and 34 are radially inward from an annular combustor casing 36, which extends circumferentially around liners 32 and 34.

Combustor 16 also includes a plurality of annular domes 40 mounted upstream from outer and inner liners 32 and 34, respectively. Domes 40 define an upstream end of combustion chamber 30 and mixer assemblies 41 are spaced circumferentially around domes 40 to deliver a mixture of fuel and air to combustion chamber 30. Because combustor 16 includes two annular domes 40, combustor 16 is known as a dual annular combustor (DAC). Alternatively, combustor 16 may be a single annular combustor (SAC) or a triple annular combustor.

Each mixer assembly 41 includes a pilot mixer 42, a main mixer 44, and an annular centerbody 43 extending therebetween. Centerbody 43 defines a chamber 50 that is in flow communication with, and downstream from, pilot mixer 42. Chamber 50 has an axis of symmetry 52, and is generally cylindrical-shaped. A pilot centerbody 54 extends into chamber 50 and is mounted symmetrically with respect to axis of symmetry 52. In one embodiment, centerbody 54 includes a fuel injector 58 for dispensing droplets of fuel into pilot chamber 50.

Pilot mixer 42 also includes a pair of concentrically mounted swirlers 60. More specifically, in the exemplary embodiment, swirlers 60 are axial swirlers and include an integrally-formed pilot inner swirler 62 and a pilot outer swirler 64. Alternatively, inner swirler 62 and outer swirler 64 are separate components. Pilot inner swirler 62 is annular and is circumferentially disposed around centerbody 54. Pilot outer swirler 64 is circumferentially disposed between pilot inner swirler 62 and a radially inner surface 78 of centerbody 43. Each swirler 62 and 64 includes a plurality of vanes (not shown). Injection orifices (not shown) for gaseous fuels are located near the trailing edge of pilot outer swirler vanes 64, and in a surface 103 extending adjacent pilot outer swirler vanes 64. Swirlers 62 and 64, and the location of the injection orifices are selected to provide desired ignition characteristics, lean stability, and low carbon monoxide (CO) and hydrocarbon (HC) emissions during low engine power operations. In one embodiment, a pilot splitter (not shown) is positioned radially between pilot inner swirler 62 and pilot outer swirler 64, and extends downstream from pilot inner swirler 62 and pilot outer swirler 64.

In one embodiment, pilot swirler 62 swirls air flowing therethrough in the same direction as air flowing through pilot swirler 64. In another embodiment, pilot inner swirler 62 swirls air flowing therethrough in a first direction that is opposite a second direction that pilot outer swirler 64 swirls air flowing therethrough.

Main mixer 44 includes an outer throat surface 81, that in combination with a radially outer surface 100 of centerbody 43, defines an annular premixer cavity 82. Main mixer 44 is concentrically aligned with respect to pilot mixer 42 and extends circumferentially around pilot mixer 42.

Dome plate 80 includes a plurality of openings 86 that extend through dome plate 80. In one embodiment, openings 86 are a series of holes that extend substantially circumferentially around axis of symmetry 52. In another embodiment, openings 86 are a series of castellated slots that extend substantially circumferentially around axis of symmetry 52.

In the exemplary embodiment, annular centerbody 43 includes a plurality of injection ports 98 located in centerbody radially outer surface 100 for injecting fuel radially outwardly from centerbody 43 into main mixer cavity 82. Fuel injection ports 98 facilitate circumferential fuel-air mixing within main mixer 44. In the exemplary embodiment, centerbody 43 includes a plurality of rows of circumferentially-spaced injection ports 98. In another embodiment, centerbody 43 includes a plurality of injection ports 98 that are not arranged in circumferentially-spaced rows. In a further alternative embodiment, annular centerbody 43 does not include fuel injection ports 98. The location of injection ports 98 is selected to adjust a degree of fuel-air mixing to achieve low nitrous oxide (NOx) emissions and to insure complete combustion under variable engine operating conditions. Furthermore, the injection port location is also selected to facilitate reducing or preventing combustion instability.

Centerbody 43 separates pilot mixer 42 and main mixer 44. Accordingly, pilot mixer 42 is sheltered from main mixer 44 during pilot operation to facilitate improving pilot performance stability and efficiency, while also reducing CO and HC emissions. Furthermore, centerbody 43 is shaped to facilitate completing a burnout of pilot fuel injected into combustor 16. More specifically, an inner passage wall 102 of centerbody 43 includes entrance portion 103, a converging surface 104, and an aft shield 106.

Surface 104 extends from entrance portion 103 to aft shield 106, and defines a venturi throat 107 within pilot mixer 42. Aft shield 106 extends between surface 104 and an annular lip 108 that is defined downstream from a radially outer wall 110 of centerbody 93. In an alternative embodiment, centerbody 43 does not include lip 108. In the exemplary embodiment, lip 108 extends radially outwardly from aft shield 106 such that a cavity 114 is defined between wall 110 and lip 108.

Swirler 140 is a radial inflow cyclone swirler and fluid-flow therefrom is discharged radially inwardly towards axis of symmetry 52. In an alternative embodiment, swirler 140 is a conical swirler. More specifically, in the exemplary embodiment, swirler 140 is coupled in flow communication to a fuel source (not shown) and is thus configured to inject fuel therethrough, which facilitates improving fuel-air mixing of fuel injected radially inwardly from swirler 140 and radially outwardly from injection ports 98. In an alternative embodiment, first swirler 140 is split into pairs of swirling vanes (not shown) that may be co-rotational or counter-rotational.

Swirler 140 is coupled against an upstream side 145 of dome plate 80 via a ferrule assembly 154. Heat shield 180 is coupled to dome plate 80 via a retaining nut 146. Retaining nut 146, a spacer 160, dome plate 80, and heat shield 180 create at least one passage 150 that extends from upstream of swirler 140 to cavity 82. In one embodiment, passage 150 is a series of holes that extend substantially circumferentially around axis of symmetry 52. In another embodiment, passage 150 is series of slots that extend substantially circumferentially around axis of symmetry 52. In the exemplary embodiment, swirler passage 150 is obliquely positioned with respect to axis of symmetry 52, such that fluids discharged from passage 150 are directed downstream and radially inwardly.

Ferrule assembly 154 positioned radially outwardly from premixer cavity 82 within portion 144 facilitates sealing upstream air from swirler cavity 82. Accordingly, ferrule assembly 154 facilitates controlling an amount of air flowing into cavity 82.

An annular spacer 160 is coupled to swirler 140 and extends downstream from swirler 140. More specifically, in the exemplary embodiment, spacer 160 is substantially L-shaped and includes a radially inner portion 162 that is coupled against swirler 140 and a radially outer portion 164 that is coupled against a downstream side 166 of dome plate 80 such that an annular gap 170 is defined and bordered by dome plate 80 and spacer 160.

Swirler passage 150 is in flow communication with gap 170 such that fluids flowing through passage 150 are discharged into gap 170. Fluids are then discharged from gap 170 through an opening 174 defined in spacer 160. More specifically, spacer opening 174 extends from a radially outer side 176 of spacer 160 to a radially inner side 178 of spacer 160. In one embodiment, opening 174 is a series of holes that extend substantially circumferentially around axis of symmetry 52. In another embodiment, opening 174 is series of slots that extend substantially circumferentially around axis of symmetry 52. In the exemplary embodiment, spacer opening 174 is obliquely positioned with respect to axis of symmetry 52, such that fluids discharged from opening 174 are directed downstream and radially inwardly.

A heat shield 180 is coupled to swirler 140 and includes an axial portion 182 and a radial portion 184 that extends substantially perpendicularly and radially outwardly from axial portion 182. More specifically, axial portion 182 extends from an upstream end 186 to radial portion 184, and radial portion 184 extends from axial portion 182 to a downstream end 188. In one embodiment, heat shield axial portion 182 is coupled to swirler 140 by a mechanical means, such as, but not limited to, a threaded fastener (not shown) that extends through a boss 190 defined within axial portion 182 and spacer portion 162 into swirler downstream portion 144. In another embodiment, heat shield axial portion 182 is coupled to swirler 140 by a non-mechanical means, such as by brazing. Boss 190 extends outwardly from heat shield axial portion 182, such that when heat shield 180 is coupled to swirler 140, a gap 192 is defined between spacer 160 and heat shield axial portion 182.

Heat shield axial portion 182 includes at least one opening 194 that extends therethrough. Specifically, opening 194 extends between gap 192 and premixer cavity 82. More specifically, opening 194 is oriented such that fluids discharged from opening 194 are accelerated therethrough, and discharged radially inwardly into premixer cavity 82 in a direction that is substantially perpendicular to axis of symmetry 52 and is substantially parallel to a direction of fluids discharged into cavity 82 from swirler 140.

Heat shield radial portion 184 is coupled to dome plate downstream side 166 at downstream end 188. More specifically, downstream end 188 extends substantially perpendicularly from radial portion 184. Accordingly, when radial portion 184 is coupled to dome plate downstream side 166, an upstream surface 200 of radial portion 184 is a distance 202 from dome plate downstream side 166.

A fuel delivery system supplies fuel to combustor 16 and includes a pilot fuel circuit and a main fuel circuit. The pilot fuel circuit supplies fuel to pilot mixer 42 and the main fuel circuit supplies fuel to main mixer 44 and includes a plurality of independent fuel stages used to control nitrous oxide emissions generated within combustor 16.

In operation, as gas turbine engine 10 is started and operated at idle operating conditions, fuel and air are supplied to combustor 16. During gas turbine idle operating conditions, combustor 16 uses only pilot mixer 42 for operating. The pilot fuel circuit injects fuel to combustor 16 through pilot fuel injector 58, or through pilot outer swirler vanes 64. Simultaneously, airflow enters pilot swirlers 60 and main mixer swirler 140. More specifically, the airflow is directed into a pilot flame zone downstream from pilot mixer 42. Pilot mixer 42 is operable at near stoichiometric or fuel-rich conditions, when the overall combustor fuel-air ratio is below a predetermined lean flammability limit. More specifically, the pilot flame becomes anchored adjacent to, and downstream from venturi throat 107, and is sheltered from main airflow discharged through main mixer 44 by annular centerbody 43.

As engine 10 is increased in power from idle to part-power operations, fuel flow to pilot mixer 42 is increased, resulting in a fuel rich pilot flame. In this mode of operation, products from the pilot flame mix with airflow discharged through main mixer swirler 140, and are further oxidized prior to exiting combustion chamber 30.

The transition from pilot-only, part-power mode to a higher-power operating mode, in which fuel flow is supplied to pilot mixer 42 and main mixer 44, occurs when the fuel flow rate is sufficient to support complete combustion in both mixers 42 and 44. More specifically, as gas turbine engine 10 is accelerated from idle operating conditions to increased power operating conditions, additional fuel and air are directed into combustor 16. In addition to the pilot fuel stage, during increased power operating conditions, main mixer 44 is supplied fuel injected radially inward through swirler 140 and/or radially outwardly from fuel injection ports 98. Main mixer swirler 140 facilitates radial and circumferential fuel-air mixing to provide a substantially uniform fuel and air distribution for combustion. Uniformly distributing the fuel-air mixture facilitates obtaining a complete combustion to reduce high power operation $NO_x$ emissions.

Furthermore, during operation, airflow is directed downstream through dome plate openings 86 and through swirler passage 150. Airflow discharged from swirler passage 150 is then channeled through spacer opening 174 for impingement cooling of heat shield 180. More specifically, airflow discharged from passage 150, and openings 86 and 174 provides impingement cooling of heat shield upstream surface 200.

After impinging heat shield upstream surface 200, spent cooling fluid is then channeled through gap 192 and directed radially inwardly into premixer cavity 82 from heat shield opening 194. More specifically, cooling fluid used for impingement cooling experiences a net loss in total pressure after being accelerated through domeplate 80 and impinging heat shield surface 200. The spent cooling fluid is then accelerated through heat shield opening 194 and channeled into premixer cavity 82. A total pressure of air flowing into premixer cavity 82 through swirler 140 is reduced as it flows from nearly stagnant conditions upstream from swirler 140 to premixer cavity 82. As such, the pressure of the spent cooling fluid entering cavity 82 through heat shield opening 194 is higher than the pressure of the air flowing into cavity 82 through swirler 140, and also exceeds the local static pressure of the air-fuel mixture within cavity 82. The pressure differential created facilitates efficient mixing of the spent cooling fluid with the air flowing into cavity 82 through swirler 140 and with the air-fuel mixture within cavity 82. More specifically, the pressure differential facilitates intimately mixing the spent cooling fluid with the air-fuel mixture prior to the mixture exiting cavity 82. Moreover, a size, orientation, and number of openings 150, 86, 174, and 194 are variably selected to facilitate such enhanced mixing.

The above-described combustor is cost-effective and highly reliable. The combustor includes a mixer assembly that includes a swirler and a heat shield that are coupled to a dome plate. The dome plate and the swirler include cooling openings that channel cooling fluid downstream for impingement cooling of the heat shield. The spent cooling fluid is then routed into the premixer cavity at a pressure that exceeds the local static pressure of the air-fuel mixture within the premixer cavity. Accordingly, the pressure differential facilitates enhanced mixing of the spent cooling fluid and the air-fuel mixture, prior to the mixture being discharged from the premixer cavity. As a result, the combustor operates with a high combustion efficiency and low carbon monoxide, nitrous oxide, and smoke emissions.

Exemplary embodiments of combustor assemblies are described above in detail. The systems are not limited to the specific embodiments described herein, but rather, components of each assembly may be utilized independently and separately from other components described herein. Each combustor assembly component can also be used in combination with other combustor assembly components.

While the invention has been described in temms of various specific embodiments, those skilled in the art will recognize that the invention can be practiced with modification within the spirit and scope of the claims.

What is claimed is:

1. A method for operating a gas turbine engine including a combustor, the combustor including at least one pilot mixer, at least one premixer assembly, a dome plate, a heat shield, and a combustion chamber, wherein each premixer assembly extends circumferentially around a corresponding pilot mixer, said method comprising:

discharging fluids through the at least one pilot mixer into the combustion chamber;

discharging fluids through the at least one premixer assembly into the combustion chamber;

discharging fluids through an air swirler within the at least one premixer assembly;

directing cooling fluids through a cooling opening defined in at least one of the premixer assembly and the dome plate towards the heat shield for impingement cooling of the heat shield; and directing spent impingement cooling fluids into the at least one premixer assembly through an opening defined in the heat shield.

2. A method in accordance with claim 1 wherein directing spent impingement cooling fluids into the at least one premixer assembly comprises directing spent impingement cooling fluids into the at least one premixer assembly at a pressure that is higher than a pressure of fluids discharged into the at least one premixer assembly from the air swirler.

3. A method in accordance with claim 1 wherein directing spent impingement cooling fluids into the at least one premixer assembly comprises directing spent impingement cooling fluids into the at least one premixer to facilitate enhanced mixing within the premixer assembly.

4. A method in accordance with claim 1 wherein directing spent impingement cooling fluids into the at least one premixer assembly comprises directing spent impingement cooling fluids into the at least one premixer assembly in a direction that is substantially parallel to a direction fluids are discharged from the air swirler into the at least one premixer assembly.

5. A mixer assembly for a gas turbine engine combustor, said mixer assembly comprising:

a pilot mixer for channeling fluid flow therethrough into a combustion chamber;

a premixer extending circumferentially around said pilot mixture for channeling fluid flow therethrough into the combustion chamber;

an air swirler for channeling fluid flow therethrough into said premixer;

a dome plate extending downstream from said air swirler; and a heat shield extending downstream from at least one of said air swirler and said dome plate, said heat shield comprising a downstream side and an upstream side, wherein said heat shield defines at least a portion of said premixer, at least one of said premixer and said dome plate comprising at least one cooling opening configured to receive cooling fluid for impingement cooling at least a portion of said heat shield, and said heat shield further comprising at least one opening extending between said upstream side and said downstream side for discharging spent cooling fluid therefrom into said premixer.

6. A mixer assembly in accordance with claim 5 wherein said at least one cooling opening coupled in flow communication with said premixer by said heat shield opening.

7. A mixer assembly in accordance with claim 5 wherein said heat shield coupled to said dome plate by a fastener.

8. A mixer assembly in accordance with claim 5 wherein said heat shield coupled to said dome plate by brazing.

9. A mixer assembly in accordance with claim 5 wherein said heat shield at least one opening configured to accelerate fluid flowing therethrough prior to being discharged into said premixer.

10. A mixer assembly in accordance with claim 5, wherein said heat shield at least one opening configured to facilitate enhanced mixing within said premixer.

11. A mixer assembly in accordance with claim 5 wherein said heat shield at least one opening configured to discharge fluids therefrom in a direction that is substantially parallel to a direction fluids are discharged from said swirler.

12. A gas turbine engine combustor comprising a mixer assembly and a combustion chamber, said mixer assembly comprising a pilot mixer, a premixer, a dome plate, and a heat shield, said pilot mixer for channeling fluid flow therethrough into the combustion chamber, said premixer extending circumferentially around said pilot mixture for channeling fluid flow therethrough into the combustion chamber, said premixer comprising an air swirler for channeling fluid flow therethrough into said premixer, said dome plate extending downstream from said air swirler, said heat shield extending downstream from at least one of said air swirler and said dome plate, and comprising a downstream side and an upstream side, said downstream side between said combustion chamber and said upstream side, said heat shield defines at least a portion of said premixer, at least one of said premixer and said dome plate comprising at least one opening extending therethrough for discharging cooling fluid therefrom for impingement cooling at least a portion of said heat shield, said heat shield further comprising at least one opening extending between said upstream side and said downstream side for discharging spent cooling fluid therefrom into said premixer.

13. A gas turbine engine combustor in accordance with claim 12 wherein said mixer assembly heat shield coupled to said dome plate by at least one of a fastener and brazing.

14. A gas turbine engine combustor in accordance with claim 13 wherein said heat shield at least one opening in flow communication with said premixer.

15. A gas turbine engine combustor in accordance with claim 14 wherein said mixer assembly at least one opening coupled in flow communication with said premixer by said heat shield at least one opening.

16. A gas turbine engine combustor in accordance with claim 13 wherein said heat shield at least one opening configured to accelerate fluid flowing therethrough prior to being discharged into said premixer.

17. A gas turbine engine combustor in accordance with claim 13 wherein said heat shield at least one opening configured to discharge fluid flowing therethrough into said premixer at a higher pressure than fluid discharged by said swirler into said premixer.

18. A gas turbine engine combustor in accordance with claim 13 wherein said heat shield at least one opening configured to facilitate enhanced mixing within said premixer.

* * * * *